(12) United States Patent
Hansen

(10) Patent No.: US 8,056,477 B2
(45) Date of Patent: Nov. 15, 2011

(54) PROTECTION SYSTEM FOR USE WITH AIRBAG INFLATORS AND INITIATORS

(75) Inventor: David Dean Hansen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 217 days.

(21) Appl. No.: 12/482,038

(22) Filed: Jun. 10, 2009

(65) Prior Publication Data

US 2010/0313783 A1   Dec. 16, 2010

(51) Int. Cl.
*B60R 21/16* (2006.01)
*F42C 11/00* (2006.01)

(52) U.S. Cl. .................. 102/202.8; 280/728.1; 280/740; 102/530

(58) Field of Classification Search ............... 102/202.8, 102/202.1, 530; 280/728.1, 740, 742
See application file for complete search history.

(56) References Cited

U.S. PATENT DOCUMENTS

| | | | | |
|---|---|---|---|---|
| 1,605,688 A * | 11/1926 | Olin et al. ........................ | 29/611 |
| 2,956,211 A * | 10/1960 | Wolfe ........................... | 361/248 |
| 3,450,414 A * | 6/1969 | Yasusaburo .................... | 280/735 |
| 3,640,224 A * | 2/1972 | Petrick et al. ............. | 102/202.2 |
| 4,033,610 A * | 7/1977 | Shingu et al. ................. | 280/737 |
| 4,422,381 A * | 12/1983 | Barrett ....................... | 102/202.2 |
| 4,530,516 A | 7/1985 | Adams et al. | |
| 4,672,523 A | 6/1987 | Ari et al. | |
| 4,708,060 A * | 11/1987 | Bickes et al. .............. | 102/202.7 |
| 5,057,041 A | 10/1991 | Yu et al. | |
| 5,337,674 A | 8/1994 | Harris et al. | |
| 5,406,889 A | 4/1995 | Letendre et al. | |
| 5,531,473 A | 7/1996 | Rink et al. | |
| 5,616,881 A | 4/1997 | Hansen | |
| 5,668,345 A | 9/1997 | Schroeder et al. | |
| 5,672,841 A | 9/1997 | Monk et al. | |
| 5,700,607 A | 12/1997 | Rath et al. | |
| 5,928,839 A | 7/1999 | Rath et al. | |
| 5,932,832 A | 8/1999 | Hansen et al. | |
| 6,070,531 A * | 6/2000 | Hansen et al. ............. | 102/202.5 |
| 6,098,548 A | 8/2000 | Rink et al. | |
| 6,110,643 A | 8/2000 | Rath et al. | |
| 6,191,949 B1 * | 2/2001 | Hansen et al. ................ | 361/735 |
| 6,220,263 B1 | 4/2001 | Randmae | |
| 6,338,500 B1 * | 1/2002 | Perotto ........................ | 280/741 |

(Continued)

FOREIGN PATENT DOCUMENTS

WO   WO 9905469 A1 *   2/1999

OTHER PUBLICATIONS

Protection of electronic circuits from overvoltages. (reprint, 1989) Scitech Book News. Portland: Jun 2003. vol. 27, Iss. 2 pp. 142-143.*

*Primary Examiner* — Michael Carone
*Assistant Examiner* — Joshua Freeman
(74) *Attorney, Agent, or Firm* — Sally J. Brown; Harness Dickey & Pierce PLC

(57) ABSTRACT

An inflator assembly may include an inflator housing and an initiator attached to the inflator housing. A varistor may be associated with the initiator and may be spaced apart from a surface of the inflator housing to define a first spark gap between the varistor and the surface of the inflator housing.

20 Claims, 4 Drawing Sheets

U.S. PATENT DOCUMENTS

| | | |
|---|---|---|
| 6,527,297 B1 | 3/2003 | Parkinson et al. |
| 6,699,076 B2 | 3/2004 | Wing |
| 6,739,621 B2 | 5/2004 | Parkinson et al. |
| 6,839,214 B2 * | 1/2005 | Berberich .................... 361/112 |
| 6,941,868 B2 | 9/2005 | Herget |
| 6,979,022 B2 | 12/2005 | Smith et al. |
| 7,055,854 B2 * | 6/2006 | Jones et al. .................. 280/731 |
| 7,249,960 B2 | 7/2007 | Annecke et al. |
| 7,316,187 B2 * | 1/2008 | Hansen ....................... 102/530 |
| 7,322,595 B2 | 1/2008 | Wallentin et al. |
| 7,343,859 B2 | 3/2008 | Matsuda et al. |
| 2006/0061077 A1 * | 3/2006 | Hansen ....................... 280/741 |
| 2008/0072748 A1 | 3/2008 | Gaudinat et al. |
| 2009/0158953 A1 | 6/2009 | Magne et al. |
| 2010/0072736 A1 * | 3/2010 | Maeda et al. ................ 280/741 |

* cited by examiner

PROTECTION SYSTEM FOR USE WITH AIRBAG INFLATORS AND INITIATORS

FIELD

The present disclosure relates to inflators and initiators of airbag assemblies and more particularly to a protection system for isolating an initiator from electrostatic energy.

BACKGROUND

This section provides background information related to the present disclosure which is not necessarily prior art.

Vehicle restraint systems typically include at least one airbag assembly having an inflator that is responsive to a sensor for identifying and reacting to an impact event. When the vehicle experiences an impact event, the sensor detects the impact and sends a signal to the inflator, whereby the inflator generates a volume of gas for inflating an inflatable cushion to protect occupants of the vehicle.

While the inflator is responsive to a signal received from the sensor, an initiator or squib is typically disposed between the sensor and the inflator and receives the signal from the sensor. The signal from the sensor may include a pulse of electrical energy that, when received by the initiator, ignites a quantity of pyrotechnic material disposed therein. Ignition of the pyrotechnic material disposed within the initiator provides a rapid burst of energy that initiates operation of the inflator device and thus, inflation of the inflatable cushion.

During assembly of the initiator, inflator, and/or vehicle, electrostatic energy may accrue on the initiator. Such electrostatic energy may migrate into the initiator and may interfere with proper operation thereof. Minimizing exposure of the initiator to electrostatic energy helps ensure that the initiator will operate as designed.

SUMMARY

This section provides a general summary of the disclosure, and is not a comprehensive disclosure of its full scope or all of its features.

An inflator assembly may include an inflator housing and an initiator attached to the inflator housing. A varistor may be associated with the initiator and may be spaced apart from a surface of the inflator housing to define a first spark gap between the varistor and the surface of the inflator housing.

In another configuration, an inflator assembly may include at least one pin extending into an inflator housing and a printed circuit board attached to the at least one pin. A varistor may be supported by the printed circuit board relative to the inflator housing and may selectively receive voltage from the at least one pin. The varistor may include at least one surface opposing an exposed surface of the inflator housing such that a first spark gap is disposed between the at least one surface of the varistor and the exposed surface of the inflator housing.

A method may include positioning an initiator relative to an inflator such that a portion of an inflator housing is exposed proximate to the initiator. The method may further include positioning a varistor proximate to the exposed portion of the inflator housing and forming a first spark gap between the varistor and the exposed portion of the inflator housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings which are drawn to scale.

DESCRIPTION OF VARIOUS ASPECTS

Figure 1:
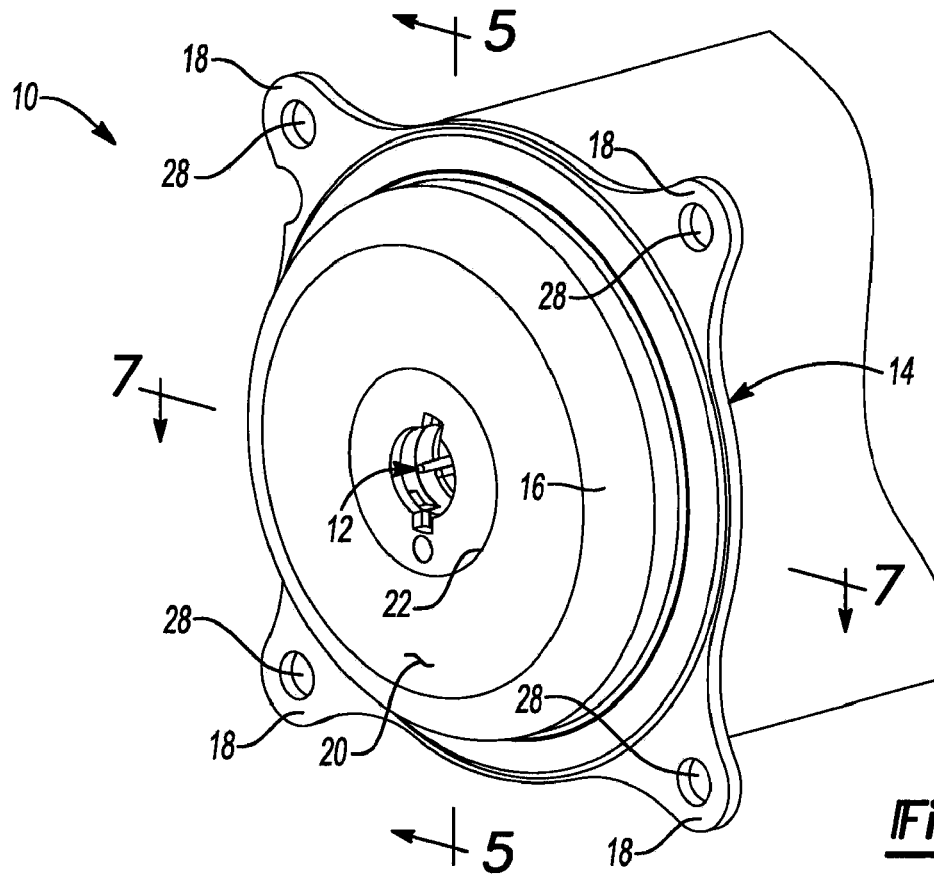
FIG. 1 is a partial perspective view of an inflator assembly incorporating an initiator in accordance with the principles of the present disclosure.
Figure 2:
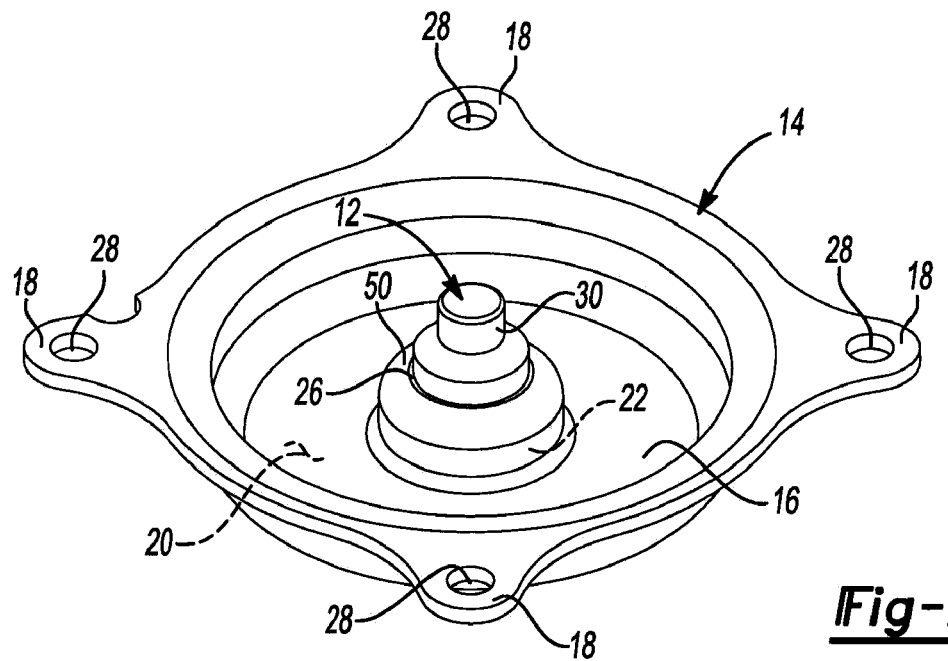
FIG. 2 is a top perspective view of an inflator base incorporating an initiator assembly in accordance with the principles of the present disclosure.
Figure 3:
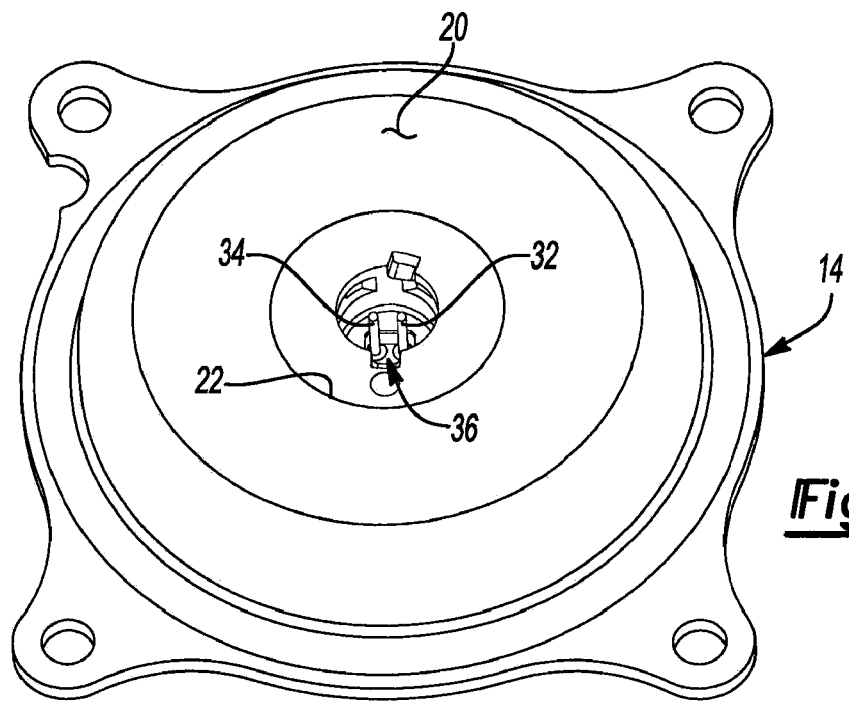
FIG. 3 is a bottom perspective view of an inflator base incorporating an initiator assembly in accordance with the principles of the present disclosure.
Figure 4:
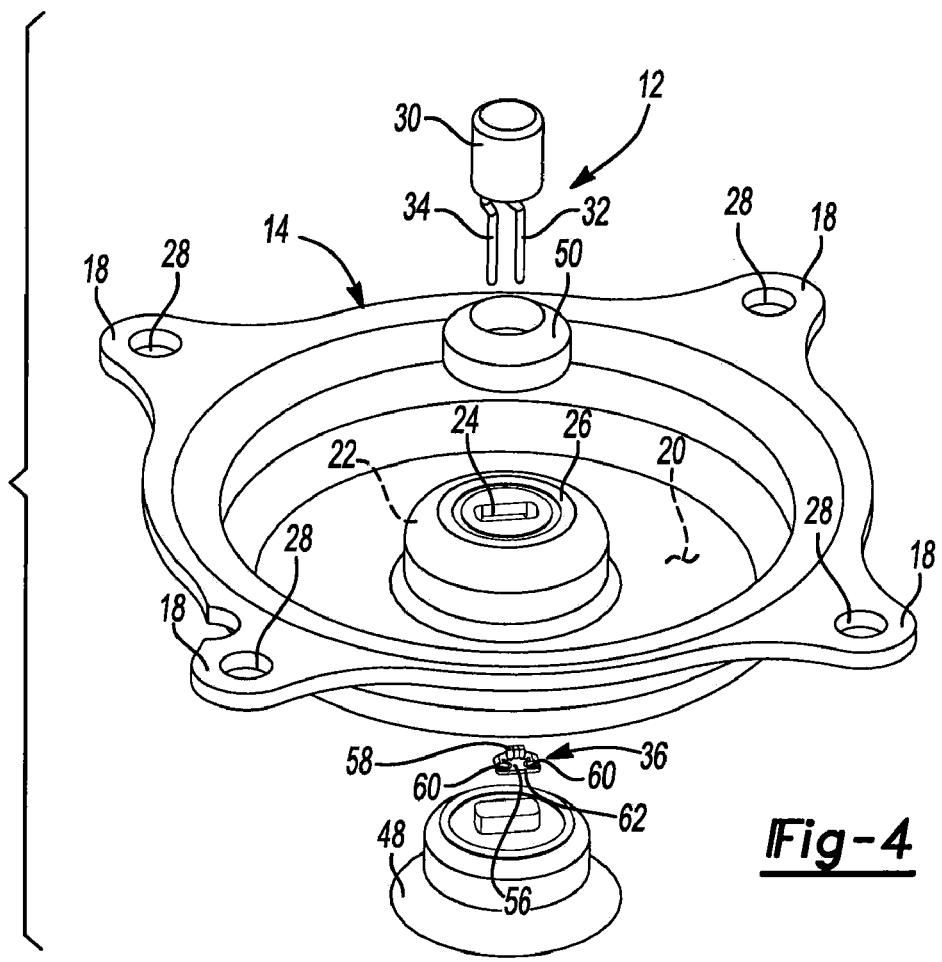
FIG. 4 is an exploded view of the assemblies of FIGS. 2 and 3.

Example embodiments will now be described more fully with reference to the accompanying drawings.

With reference to the figures, an inflator assembly 10 is provided and may include an initiator assembly 12 that selectively triggers or initiates operation of the inflator assembly 10. The initiator assembly 12 may be received generally by and attached to an inflator base 14 and may cooperate with the inflator base 14 to dissipate electrostatic energy received by either the inflator assembly 10 or initiator assembly 12.

The inflator base 14 may include a main body 16 and a plurality of mounting features 18 that attach the inflator base 14 and, thus, the inflator assembly 10, to an external structure such as, for example, an airbag housing (not shown). The main body 16 may include a bottom surface 20, a pocket 22, and an aperture 24 formed through a base 26 of the pocket 22. The mounting features 18 may extend from the main body 16 and may each include an aperture 28 that selectively receives a fastener (not shown) for attaching the inflator base 14 and inflator assembly 10 to an external structure such as, for example, an airbag housing or other vehicle structure (neither shown).

With particular reference to FIGS. 4-7, the initiator assembly 12 is shown and may include a housing 30, an isolated pin 32, a ground pin 34, and an electrostatic-protection system 36. The housing 30 may include a cup 38 received therein, whereby the cup 38 houses a pyrotechnic material 40, a charge holder 42, a first insulator 44, and a header 46. The charge holder 42 generally surrounds the pyrotechnic material 40 and separates the pyrotechnic material 40 from the cup 38. The first insulator 44 generally surrounds the isolated pin 32 and insulates the isolated pin 32 from the header 46. The header 46 surrounds the first insulator 44 and provides an electrical connection between the isolated pin 32 and the ground pin 34 via a thin-metal connector such as, for example, a bridgewire (not shown) and a collar (not shown) that electrically couples the ground pin 34 to the header 46 at a junction of the ground pin 34 and the header 46.

Figure 5:
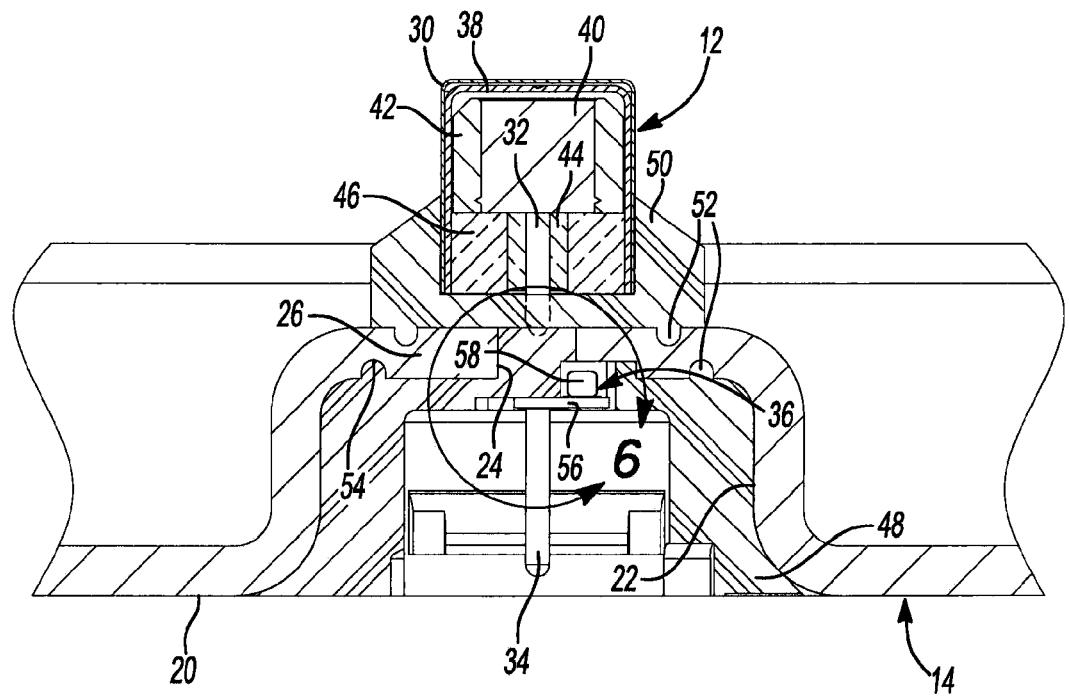
FIG. 5 is a cross-sectional view taken along the line 5-5 of FIG. 1.

As shown in FIG. 5, a distal end of the isolated pin 32 is received generally within the header 46, is insulated from the header 46 by the first insulator 44, and is disposed in close proximity to the pyrotechnic material 40. The first insulator 44 may include a glass seal to ensure that the isolated pin 32 is electrically isolated from the header 46. Positioning a distal end of the isolated pin 32 in close proximity to the pyrotechnic material 40 likewise positions the thin-metal bridgewire in close proximity to the pyrotechnic material 40. As such, when the isolated pin 32 receives sufficient electrical energy, the electrical energy is transferred from the isolated pin 32 to the ground pin 34 via the bridgewire, thereby heating the bridgewire and causing ignition of the pyrotechnic material 40. Specifically, providing the isolated pin 32 with sufficient electrical energy such that the electrical energy passes from the isolated pin 32 to the ground pin 34 via the bridgewire raises a temperature of the bridgewire due to the relative size of the bridgewire when compared to the larger isolated pin 32 and ground pin 34. This increase in temperature of the bridgewire causes the pyrotechnic material 40 disposed within the cup 38 to ignite and release a rapid burst of energy which, in turn, triggers operation of the inflator assembly 1 0.

The isolated pin 32 and ground pin 34 may extend through the aperture 24 formed in the inflator base 14. The aperture 24 may include a generally oval or slotted configuration to accommodate the side-by-side configuration of the isolated pin 32 and ground pin 34. The isolated pin 32 and ground pin 34 may be insulated from the inflator base 14 proximate to the aperture 24 via a first insulator 48 and a second insulator 50. The first insulator 48 and the second insulator 50 may be formed from any suitable insulating material such as, for example, nylon, and may be over molded once the initiator assembly 12 is installed on the inflator base 14.

The first insulator 48 may be received within the pocket 22 of the inflator base 14 and may allow passage of the isolated pin 32 and ground pin 34 therethrough. The second insulator 50 may be attached to the base 26 of the pocket 22 and may at least partially surround the isolated pin 32, ground pin 34, and housing 30 of the initiator assembly 12 to both isolate the isolated pin 32 and ground pin 34 from the inflator base 14 proximate to the opening 24 as well as to hold the isolated pin 32, ground pin 34, and housing 30 in a desired position relative to the inflator base 14. Each of the first insulator 48 and the second insulator 50 may include a series of projections 52 that extend into mating recesses 54 of the inflator base 14 to attach the first insulator 48 and the second insulator 50 to the inflator base 14.

Figure 6:
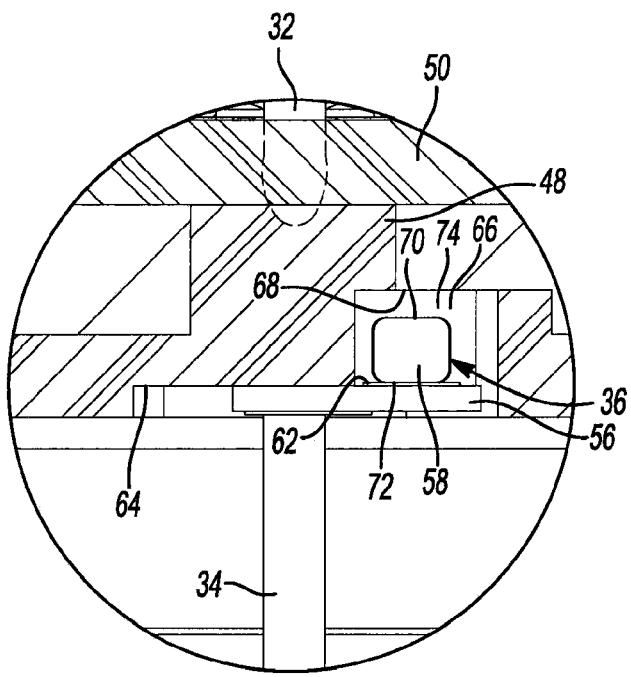
FIG. 6 is a more detailed cross-sectional view of the area shown in FIG. 5.

With particular reference to FIGS. 5 and 6, the electrostatic-protection system 36 is shown to include a printed circuit board 56 and a varistor 58. The printed circuit board 56 may include a pair of apertures 60 that respectively receive the isolated pin 32 and ground pin 34 and may include a series of solder lands 62. The solder lands 62 may electrically attach the isolated pin 32 and ground pin 34 to the printed circuit board 56 and may likewise be disposed generally between the varistor 58 and the printed circuit board 56 to attach the varistor 58 to the printed circuit board 56.

Figure 7:
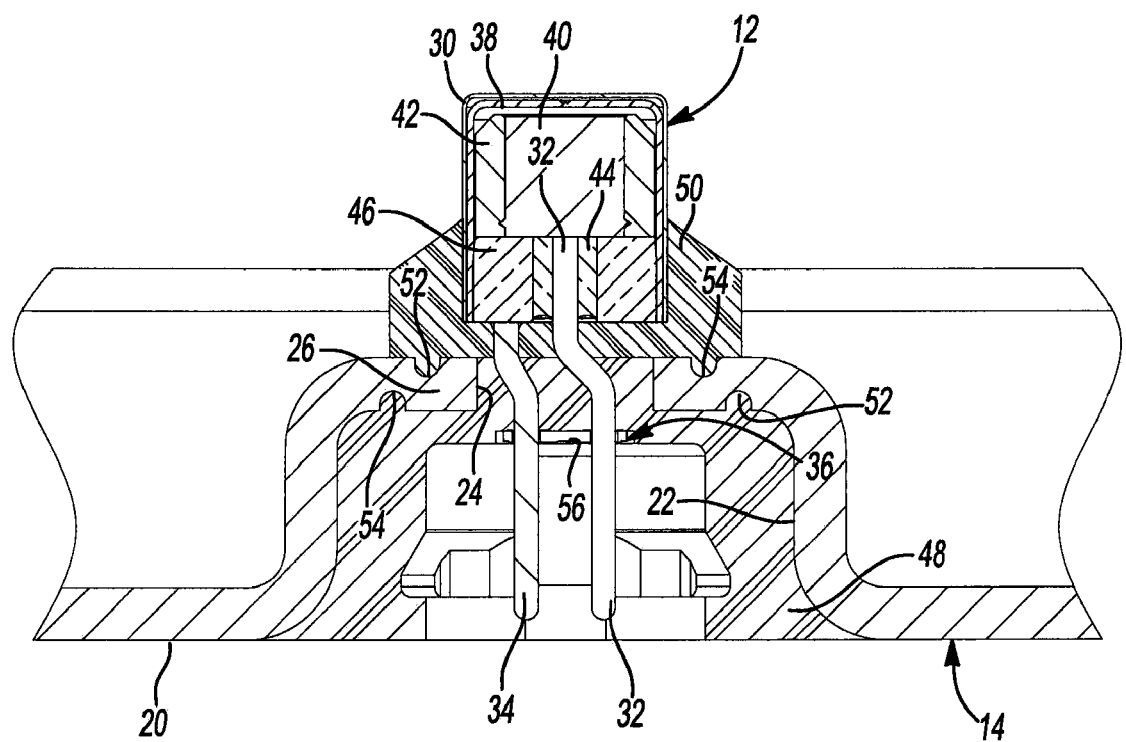
FIG. 7 is a cross-sectional view taken along line 7-7 of FIG. 1.

The printed circuit board 56 may be received within and attached to at least a portion of the first insulator 48, as shown in FIGS. 5-7. The first insulator 48 may include a substantially planar surface 64 (FIG. 6) that abuts a top portion of the printed circuit board 56. The first insulator 48 may also include a pocket 66 (FIG. 6) disposed adjacent to the varistor 58 such that a metallic or otherwise electrically conductive surface 68 of the inflator base 14 is exposed near the varistor 58. The pocket 66 of the first insulator 48 may be formed during formation of the first insulator 48 by preventing the material of the first insulator 48 from flowing into the area of the pocket 66. When the printed circuit board 56 is attached to the isolated pin 32 and ground pin 34 such that the printed circuit board 56 abuts the planar surface 64 of the first insulator 48, the pocket 66 is positioned relative to the printed circuit board 56 such that the varistor 58 is received generally within the pocket 66 and opposes the electrically conductive surface 68 of the inflator base 14.

The varistor 58 may be a metal oxide varistor including a ceramic mass of zinc oxide grains in a matrix of other metal oxides. The varistor 58 may include a top surface 70 that opposes the electrically conductive surface 68 of the inflator base 14 when the printed circuit board 56 is attached to the isolated pin 32 and the ground pin 34 and a bottom surface 72 that is attached to the printed circuit board 56 by the solder lands 62. When the printed circuit board 56 is attached to the isolated pin 32 and the ground pin 34 such that the printed circuit board 56 abuts the planar surface 64 of the first insulator 48, the top surface 70 of the varistor 58 is spaced apart from and opposes the electrically conductive surface 68 of the inflator base 14. Because the first insulator 48 includes a pocket 66 in the region of the varistor 58, the top surface 70 of the varistor 58 is exposed to the electrically conductive surface 68 of the inflator base 14. As such, a spark gap 74 (FIG. 6) is defined between the top surface 70 of the varistor 58 and the electrically conductive surface 68 of the inflator base 14.

With particular reference to FIGS. 5-7, operation of the inflator assembly 10, initiator assembly 12, and electrostatic-protection system 36 will be described in detail. Under normal operation, when a signal is sent to the initiator assembly 12 indicating that a vehicle has experienced an impact event, the electrical energy is sent to the isolated pin 32 and is transmitted to the ground pin 34 via the bridgewire. This electrical energy heats the bridgewire, thereby causing the pyrotechnic material 40 disposed generally within the housing 30 of the initiator 12 to rapidly release heat and cause the inflator assembly 10 to rapidly generate a volume of gas and inflate an inflatable restraint (not shown).

While electrical energy is permitted to flow through the isolated pin 32 and reach the ground wire to heat the ground wire and ignite the pyrotechnic material 40 under normal operating conditions (i.e., during an impact event, for example), should stray electrical energy be received by the isolated pin 32 or ground pin 34, the electrostatic-protection system 36 serves to direct this stray electrical energy away from the pyrotechnic material 40. Directing stray electrical energy away from the pyrotechnic material 40 prevents inadvertent ignition of the pyrotechnic material 40, degradation of the pyrotechnic material 40, and/or degradation of the connection of the isolated pin 32, ground pin 34, and bridgewire to the respective components 40, 42, 44. Stray electrical energy may often be the result of electrostatic energy and may occur during manufacturing of the inflator assembly 10, initiator assembly 12, and/or installation of the inflator assembly 10 and/or initiator assembly 12 into a vehicle (not shown). Such electrostatic energy may be collected on a housing of the initiator assembly 12 such as, for example, housing 30, or may be received by either of the isolated pin 32 or ground pin 34. Regardless of the source of the electrostatic energy, the energy, once received by either of the isolated pin 32 and ground pin 34, may be directed away from the pyrotechnic material 40 by the varistor 58 and/or spark gap 74.

Electrostatic energy may be dissipated by the varistor 58 to prevent the energy from reaching the pyrotechnic material 40. For example, if the isolated pin 32 receives electrostatic energy, the varistor 58 directs the energy to the ground pin 34 and away from the pyrotechnic material 40 to prevent the energy from causing inadvertent ignition of the pyrotechnic material 40. Likewise, if the electrostatic energy is received by the ground pin 34, the energy is diverted toward the isolated pin 32 and away from the pyrotechnic material 40 by the varistor 58 to avoid inadvertent ignition of the pyrotechnic material 40. In the foregoing situations, the varistor 58 acts as a switch, whereby energy received from one of the isolated pin 32 and ground pin 34 is diverted to the other of the isolated pin 32 and ground pin 34.

The varistor 58 will act as a switch, as described above, should the electrostatic energy received by the isolated pin 32 or ground pin 34 exceed a threshold voltage. In one configuration, the threshold voltage is approximately 5,000 to 6,000 volts. As such, if the voltage received by the isolated pin 32 or the ground pin 34 is greater than 5,000 to 6,000 volts, the varistor 58 transfers the voltage from the isolated pin 32 or ground pin 34 to the other of the isolated pin 32 and ground pin 34. However, if the voltage received by the isolated pin 32 or ground pin 34 is less than the threshold voltage (i.e., less than 5,000 to 6,000 volts), the voltage arcs from the varistor 58 to the inflator base 14 via the spark gap 74 and is dissipated by the inflator base 14.

The electrostatic energy applied to either the isolated pin 32 or ground pin 34 may arc between the varistor 58 or the solder lands 62 to the electrically conductive surface 68 of the inflator base 14 if the voltage applied to the isolated pin 32 or ground pin 34 exceeds the spark gap 74 threshold breakdown voltage. The electrostatic energy is allowed to spark between the varistor 58 or solder lands 62 to the electrically conductive surface 68 of the inflator base 14 due to the pocket 66 formed in the first insulator 48 proximate to the varistor 58. Note that the voltage breakdown potential (i.e., the threshold voltage) is defined by the spark gap 74 between the varistor 58 or the solder lands 62 to the electrically conductive surface 68 of the inflator base 14.

The spark gap 74 may be used to control and adjust the voltage breakdown threshold. For example, if the threshold voltage is 5,000 volts, a voltage applied above 5,000 volts will arc from either the varistor 58 or the solder lands 62 to the electrically conductive surface 68 of the inflator base 14, as described above. This threshold voltage may be reduced from 5,000 volts if the spark gap 74 is reduced and may be increased from 5,000 volts if the spark gap 74 is increased. For example, if the distance between the top surface 70 of the varistor 58 is spaced apart a greater distance from the electrically conductive surface 68 of the inflator base 14, the threshold voltage required to allow electricity to arc from either the varistor 58 or the solder lands 62 to the electrically conductive surface 68 of the inflator base 14 would be increased. Likewise, if the top surface 70 of the varistor 58 is positioned in close proximity to the electrically conductive surface 68 of the inflator base 14, the voltage required to allow electricity to arc from the varistor 58 or the solder lands 62 to the electrically conductive surface 68 of the inflator base 14 is reduced. Therefore, controlling the spark gap 74 controls operation of the electrostatic-protection system 36 by dictating the threshold voltage by which electricity will arc from the varistor 58 or the solder lands 62 to the electrically conductive surface 68 of the inflator base 14.

The threshold voltage may be further tailored by adjusting a position of the solder lands 62 relative to the electrically conductive surface 68 of the inflator base 14. For example, because the varistor 58 is disposed between the solder lands 62 and the electrically conductive surface 68 of the inflator base 14, energy received by the printed circuit board 56 may be absorbed by the varistor 58 such that the electricity does not arc from the varistor 58 but, rather, arcs from the solder lands 62.

In any of the foregoing configurations, if electrostatic energy applied to either of the isolated pin 32 or ground pin 34 arcs from the printed circuit board 56 either via the varistor 58 or solder lands 62 to the electrically conductive surface 68 of the inflator base 14, the applied energy is dissipated by the inflator base 14 such that the applied energy is moved away from the pyrotechnic material 40 of the initiator assembly 12.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An inflator assembly comprising:
an inflator housing;
an initiator attached to said inflator housing; and
a varistor associated with said initiator and spaced apart from a surface of said inflator housing to define a first spark gap between said varistor and said surface of said inflator housing.

2. The inflator assembly of claim 1, wherein said initiator includes a printed circuit board.

3. The inflator assembly of claim 2, wherein said varistor is attached to said printed circuit board.

4. The inflator assembly of claim 2, wherein said printed circuit board includes at least one solder land defining a second spark gap between said at least one solder land and said surface of said inflator housing.

5. The inflator assembly of claim 4, wherein said at least one solder land connects said varistor to said printed circuit board.

6. The inflator assembly of claim 1, further comprising an insulator insulating said initiator from said inflator housing.

7. The inflator assembly of claim 6, wherein said insulator includes a pocket exposing said surface of said inflator housing proximate to said varistor.

8. The inflator assembly of claim 1, wherein said surface of said inflator housing is exposed proximate to a surface of said varistor.

9. An inflator assembly comprising:
an inflator housing;
at least one pin extending into said inflator housing;
a printed circuit board attached to said at least one pin;
a varistor supported by said printed circuit board relative to said inflator housing for selectively receiving voltage from said at least one pin, said varistor including at least one surface opposing an exposed surface of said inflator housing; and
a first spark gap disposed between said at least one surface of said varistor and said exposed surface of said inflator housing.

10. The inflator assembly of claim 9, wherein said printed circuit board includes at least one solder land.

11. The inflator assembly of claim 10, further comprising a second spark gap defined between said at least one solder land and said exposed surface of said inflator housing.

12. The inflator assembly of claim 10, wherein said at least one solder land connects said varistor to said printed circuit board.

13. The inflator assembly of claim 9, further comprising an insulator insulating at least one of said at least one pin and said printed circuit board from said inflator housing.

14. The inflator assembly of claim 13, wherein said insulator includes a pocket disposed proximate to said varistor to permit said first spark gap to extend from said at least one surface of said varistor to said exposed surface of said inflator housing.

15. A method comprising:
positioning an initiator relative to an inflator;
exposing a portion of an inflator housing proximate to said initiator;
positioning a varistor proximate to said exposed portion of said inflator housing; and
forming a first spark gap between said varistor and said exposed portion of said inflator housing.

16. The method of claim 15, further comprising positioning a printed circuit board relative to said exposed portion of said inflator housing.

17. The method of claim 16, further comprising forming a second spark gap between said printed circuit board and said exposed portion of said inflator housing.

18. The method of claim 17, wherein forming said second spark gap includes forming at least one solder land on said printed circuit board, said second spark gap extending between said at least one solder land and said exposed portion of said inflator housing.

19. The method of claim 18, wherein forming said first insulator includes preventing a material of said first insulator from being formed between said varistor and said exposed portion of said inflator housing.

20. The method of claim 15, further comprising forming a first insulator to insulate said initiator form said inflator housing.

* * * * *